United States Patent
Petersen

[15] 3,691,142
[45] Sept. 12, 1972

[54] CONTROL SYSTEM FOR AN ETHYLENE COPOLYMERIZATION PROCESS

[72] Inventor: Robert E. A. Petersen, Wilmington, Del.

[73] Assignee: E. I. du Pont de Nemours and Company, Wilmington, Del.

[22] Filed: May 29, 1969

[21] Appl. No.: 828,876

[52] U.S. Cl.........260/80.78, 260/88.2 R, 260/94.9 P
[51] Int. Cl.........C08f 15/40, C08f 15/04, C08f 1/28
[58] Field of Search..............260/80.78, 88.2, 94.9 P

[56] References Cited
UNITED STATES PATENTS

| | | | |
|---|---|---|---|
| 3,093,620 | 6/1963 | Gladding | 260/79.5 |
| 3,093,621 | 6/1963 | Gladding | 260/80.5 |
| 3,156,537 | 11/1964 | McLeod | 23/288 |
| 3,257,375 | 6/1966 | Norwood | 260/94.9 |
| 3,506,634 | 4/1970 | Di Drusco et al | 260/88.2 |

Primary Examiner—Joseph L. Schofer
Assistant Examiner—Richard A. Gaither
Attorney—Louis Del Vecchio

[57] ABSTRACT

In manufacturing ethylene copolymers in a gas-liquid phase reactor general reactor fouling is avoided by regulating ethylene feed in response to gas pressure in the reactor.

1 Claim, 1 Drawing Figure

PATENTED SEP 12 1972

3,691,142

INVENTOR
ROBERT E. A. PETERSEN

BY *Louis Del Vecchio*

ATTORNEY

CONTROL SYSTEM FOR AN ETHYLENE COPOLYMERIZATION PROCESS

BACKGROUND OF THE INVENTION

The copolymerization of ethylene with one or more α-olefins such as propylene in a copolymer-solvent solution using a coordination catalyst system is well known in the art. When conducted as a continuous process in a gas liquid phase reactor, one obtains an ethylene polymer, dissolved in the solvent, which is continuously isolated and removed from the reactor by one of the various means known to those skilled in the art.

In the liquid phase of the reactor, the monomers polymerize at different rates. For example, to obtain a copolymer of ethylene and propylene having approximately 50 mole percent of each monomer in the copolymer, a large excess of propylene is needed, e.g., the mole ratio of ethylene to propylene dissolved in the polymerization medium should be about 1:10. When equal amounts of ethylene and propylene are polymerized in solution the copolymer prepared is extremely high in ethylene content and is not soluble in saturated hydrocarbon solvents at ordinary polymerization conditions.

In the gas phase of a partially filled liquid phase reactor, the partial pressure of ethylene is usually less than the partial pressure of propylene. For example, if the ethylene to propylene mole ratio in the liquid phase is about 1:10, the ratio of the partial pressure of ethylene to propylene in the gas phase may be about 1:3.

When the monomer ratios in the liquid phase of the reactor become unbalanced thereby forming some insoluble polymer, a polymer slurry results in which polymer sticks to the reactor walls and attendant equipment thereby fouling the reactor. There are two types of reactor fouling, general and local. Local reactor fouling occurs at the point where materials are fed into the reactor. Localized fouling occurs if feed streams of high E/P ratio are condensed and cooled or absorbed in solution and are introduced into the reactor entirely in the liquid phase. Then copolymers with a high ethylene content form on contacting the catalyst monomer feed inlets even though the bulk of the polymer formed is of the desired composition having lower ethylene content and is soluble in the reaction medium. General reactor fouling on the other hand occurs when the overall ratio of monomers in the reactor becomes unbalanced and, due to an excessive amount of ethylene, there is produced an ethylene rich insoluble polymer. This can occur when polymer production rate is unexpectedly reduced such as by catalyst poisoning or catalyst metering difficulties.

Therefore, in a process of manufacturing ethylene copolymers in solution in gas-liquid phase polymerization reaction, there is a need for a method of avoiding general reactor fouling caused by sudden and unexpected upsets in polymer production that cannot be anticipated or controlled by the routine reactor control system.

SUMMARY OF THE INVENTION

Accordingly, this invention provides an improved process for manufacturing ethylene copolymers that avoids general reactor fouling. The process involves the conventional manner of copolymerizing ethylene with at least one other α-olefin in the presence of a catalyst in a solution carried out in a gas-liquid phase reactor having a primary control system that maintains the reactor conditions within a predetermined routine operating range with the exception that a secondary control system is provided. When the polymerization rate unexpectedly becomes unbalanced which if not corrected would cause the formation of ethylene rich insoluble polymers which can foul the reactor, the secondary control system overrides the primary control system and controls the amount of ethylene being fed into the reactor.

The secondary control process consists essentially of (a) sensing the pressure of the gas phase, (b) transmitting a signal representative of the gas phase pressure to a controller responsive to the pressure signal and having a predetermined set point to operate the controller when the reactor pressure is above the routine operating pressure but below the reactor pressure that would indicate the formation of insoluble polymer; and (c) transmitting a signal from the controller to a valve in the ethylene feed line, responsive to the controller signal, to control the flow of ethylene to the reactor.

BRIEF DESCRIPTION OF THE DRAWING

The drawing illustrates a flow diagram of a preferred embodiment of the invention which is described in the example.

DETAILS OF THE INVENTION

Figure 1:
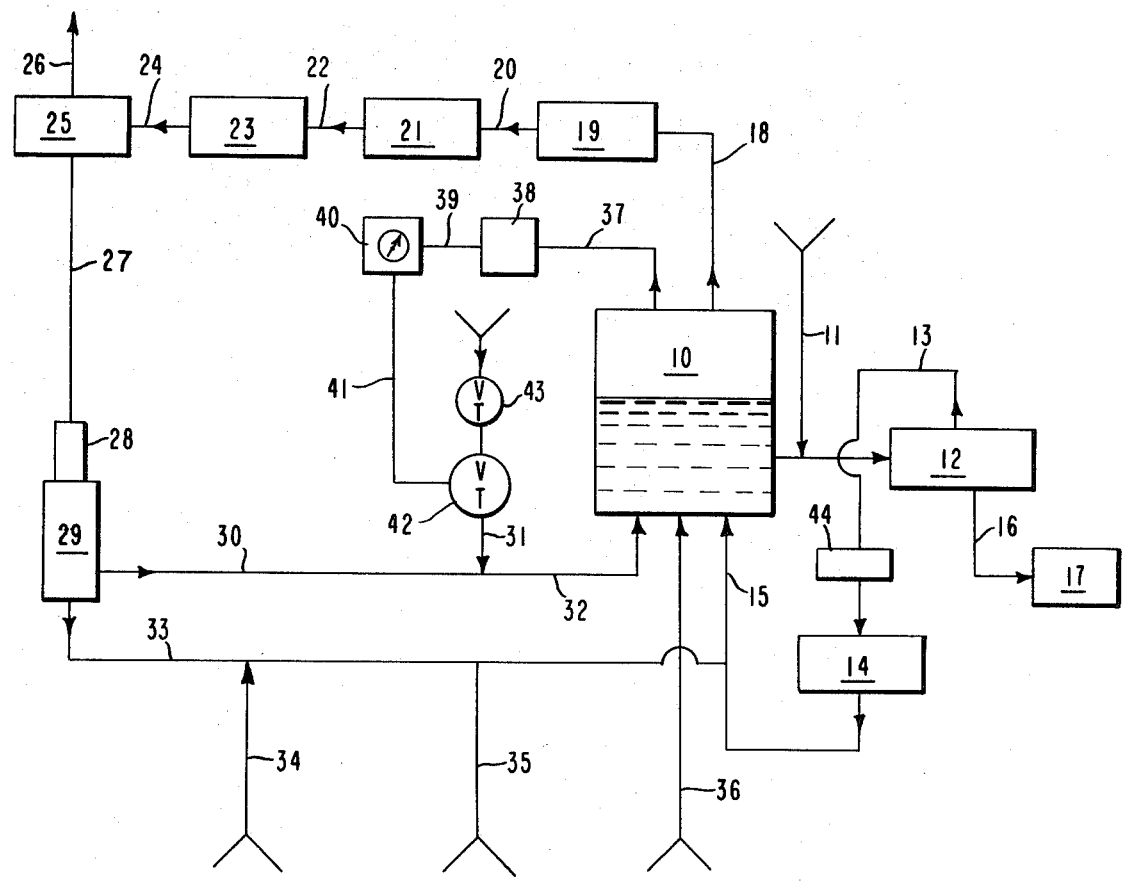

In the polymerization of ethylene copolymers carried out in a gas-liquid phase reactor it has unexpectedly been found that as the rate of polymerization changes the partial pressure of ethylene changes much faster than the partial pressure of the other monomer or monomers present. When the rate of polymerization unexpectedly changes such as by catalyst poisoning to produce an ethylene rich copolymer which is insoluble in the reaction medium, the partial pressure of ethylene rapidly increases producing an increase in the overall pressure in the gas phase of the reactor. The primary control system is too slow to correct unexpected imbalances before reactor fouling would occur. Therefore, it has been found that the gas phase pressure of the reactor can be monitored and pressure increases, above the normal operating pressure range, transmitted to a secondary control system and used to reduce the amount of ethylene fed into the reactor. When the pressure increases above the normal pressure range, the amount of ethylene fed into the reactor is reduced. As the reaction is brought into balance by the primary control system, the amount of ethylene fed into the reactor is increased to the normal flow rate.

A useful secondary control system combines (a) a pressure transmitter to take the gas pressure in the reactor and transmit a signal representative of the gas pressure to (b) a controller capable of receiving the signal from the pressure transmitter, comparing the pressure signal to a predetermined set point and in turn emitting a signal which is a function of the pressure deviation from the controller set point to (c) a control valve capable of receiving and responding to a signal from the controller to vary the amount of ethylene entering the reactor thereby maintaining the reactor pressure at or below a predetermined set point. This control system is employed as a secondary intermittent control to override a reactor being controlled by conventional means.

The equipment to execute this operation is commercially available and it can be pneumatically or electronically operated. For example, the pressure transmitter can be a 210T Series Transcope Pressure Transmitter made by Taylor Instrument Co., Rochester, New York; the controller can be a 400 Series Transcope Controller coupled with a 90J Series Transcope Recorder also available from Taylor Instrument Co.; and the control valve can be an in-line air operated needle valve.

This invention is generally applicable to the copolymerization of ethylene with one or more $\alpha$-olefins such as propylene or 1-butene. Small proportions of one or more other monomers can also be polymerized; for example, it is a preferred embodiment of this invention to have nonconjugated hydrocarbon dienes of from about five to 22 carbon atoms polymerized during the copolymerization process in amounts up to as high as 15 weight percent of the total solution. Representative dienes are 1,4-hexadiene, dicyclopentadiene, 5-methylene-2-norbornene, 5-ethylidene-2-norbornene, and 1,5-cyclooctadiene. The general preparation of such polymers is set forth in U.S. Pat. Nos. to Gresham et al., 2,933,480; Tarney, 3,000,866; Gladding et al., 3,063,973 and 3,093,620; Gladding, 3,093,621; Adamek et al., 3,211,709; and Natta et al., 3,260,708 and 3,300,459.

Typically, the polymers produced by the process will be soluble copolymers of ethylene containing from about 20 percent to 60 percent propylene but will preferably contain from about 25 percent to 50 percent propylene, by weight.

The invention will usually be found to be valuable when the polymerization is conducted in a hydrocarbon solvent because of the great tendency for general reactor fouling under these conditions. The invention is particularly valuable when the polymerization is conducted in saturated linear hydrocarbons containing from five to eight carbon atoms such as hexane, pentane and heptane.

The polymerization process is conducted in the presence of a coordination catalyst system of the type now well known to those skilled in the art and which is described in detail in the U.S. Patents referred to above. It should be noted that for each different catalyst combination a different monomer ratio in the solution is required to yield a given polymer. Consequently, each catalyst system will also have a certain limit of concentration in the solution where general reactor fouling will tend to occur.

Specific catalyst systems which are useful are those using vanadium tris(acetylacetonate) (VAA), vanadium oxytrichloride ($VOCl_3$), diisobutyl aluminum monochloride (DIBAC) as well as the system using vanadium tetrachloride ($VCl_4$). In using such catalysts, suitable aluminum vanadium (Al/V) ratios and amounts of catalyst employed per liter of total solution will depend on the specific compounds and conditions employed. These are well known to those skilled in the art, e.g., as set forth in the above patents. Frequently, Al to V ratios will fall within the range from 2:1 to 20:1. Likewise, the amount of catalyst expressed as the amount of vanadium content frequently ranges from about 0.00001 to 0.002 moles per liter. Other useful catalysts are ethyl aluminum sesqui chloride and aluminum trialkyl such as triethyl aluminum and triisobutyl aluminum.

Coordination catalyst compositions can be employed which contain compounds which enhance their activity, such as benzotrichloride, hexachloropropene, and the like. In using those compositions the Al/V ratio may be greatly increased and the vanadium concentration greatly reduced. See, for example, DeJong, et al., U.S. Pat. No. 3,072,630; Nakaguchi et al., U.S. Pat. No. 3,328,366; and Christman, U.S. Pat. No. 3,301,834.

The temperature at which the polymerization reactor is operated will, of course, have some effect on the maximum amount of ethylene which can be tolerated in the polymer without causing fouling. Generally, the higher the temperature, the more likely high-ethylene content polymers are to be soluble in the solvent. While the polymerization reactor can be operated satisfactorily at temperatures ranging from about $-20°C$. to $80°C$., it is preferred that the reaction be conducted within the range of about $20°$ to $50°C$. Within these ranges the invention is very advantageous.

An advantage of this invention is the fact that the pressure of the gas phase of the reactor is the total of the partial pressures of various gases and yet this pressure signal can be used to change the amount of a single ingredient in the reactor, namely ethylene, to avoid general reactor fouling. The use of this invention provides an efficient process of manufacturing ethylene copolymers whose utility as valuable elastomers is well known.

The following example illustrates this invention. All parts, percentages, and proportions are by weight unless otherwise specified.

EXAMPLE

FIG. I illustrates a typical application of the present invention to an ethylene copolymerization process. A reactor 10 for the continuous solution copolymerization of ethylene, propylene and 1,4-hexadiene in a n-hexane solvent is operated at $30°C$., 35.6 psig., and a residence time of about 30 minutes. The reactor has a vapor phase above a liquid phase. At equilibrium, the mole ratio of propylene to ethylene in the liquid phase is approximately 10:1 and the mole ratio of n-hexane solvent to propylene is approximately 7:1. A coordination catalyst is formed by pre-mixing VAA with DIBAC. A liquid stream is continuously removed from the liquid phase of reactor 10 and combined with a solvent and 1,4-hexadiene vapor stream 11 at a temperature of about $185°C$. and 70.6 psig. and introduced into a stripper 12 at about 5 psig. The overhead vapor stream 13 from the stripper containing chiefly volatile materials is compressed in compressor 44, condensed at a pressure 45.6 psig. and $-15°C$. in condenser 14 and fed through conduit 15 into the reactor 10 as shown. The liquid stream from the stripper is sent through conduit 16 into conventional product isolation equipment indicated on the drawing as 17 for further processing. Typical operation of the process yields about 25 parts per hour of a terpolymer of about 60.7 weight percent ethylene, 36 weight percent propylene and 3.3 weight percent 1,4-hexadiene having a Mooney viscosity (ML–4/$250°F$.) of about 60.

The overhead vapor phase stream from the reactor 10 containing chiefly unpolymerized ethylene and propylene plus hexane and lesser amounts of other volatile materials is fed through conduit 18 into a compressor 19 where it is compressed to about 400 psig. From there it is sent through conduit 20 to a cooler 21 and through conduit 22 to a condenser 23 wherein the temperature is brought down to about −15°C. The stream is then passed through conduit 24 to a purge pot 25 where some of the uncondensed gases are removed through vent 26 in order to hold the inerts down to a reasonable level and from there it is passed through conduit 27 to a letdown device 28 where it adiabatically flashes to −44°C. at 45.6 psig. in flasher 29. The gas phase stream from the flasher is passed through conduit 30 where it combines with a gaseous ethylene stream at −15°C. at 45.6 psig. in conduit 31 and is fed into the reactor through stream 32. The liquid phase stream from the flasher is carried through conduit 33 and combines with a stream which is predominantly propylene and 1,4-hexadiene also maintained at about −15°C. at 45.6 psig. in conduit 34; this combined liquid stream is further combined with a stream that is predominantly hexane solvent and 1,4-hexadiene carried in conduit 35. As illustrated, these streams are finally combined with stream 15 and are introduced into the reactor 10. Through conduit 36 a stream of VAA and DIBAC catalyst components are introduced into a solution of hexane containing methylene chloride together with some 1,4-hexadiene.

As mentioned above, under normal operation, reactor 10 will have a given pressure which depends on the liquid composition and temperature therein. If the production rate drops, as can result when adventitious catalyst poisons enter the system, the pressure in reactor 10 will rapidly rise primarily due to an increase in ethylene concentration in the liquid phase. This can result in a rich ethylene insoluble copolymer and fouling of the reactor. The propylene and 1,4-hexadiene concentrations in the liquid phase remain relatively constant.

In accordance with this invention the increase in reactor 10 pressure due to the ethylene therein can be used to control the makeup ethylene feed from conduit 31 to prevent the formation of insolubles in reactor 10.

The vapor phase portion of reactor 10 is connected through conduit 37 to pneumatic pressure transmitter 38. Constant air pressure at 20 psig. is supplied through conduit to pressure transmitter through means not shown. Pressure transmitter 38 converts the reactor pressure it senses into a 3 to 15 psig. output. It is calibrated over a reasonable pressure range (e.g., 3 and 15 psig. outputs corresponding to zero psig. and 200 psig. reactor pressures, respectively). The output from pressure transmitter 38 is transmitted through conduit 39 to recorder-controller 40. The controller portion of controller 40 emits a 3 to 15 psig. air signal through conduit 41 to valve 42 on conduit 31 of the makeup ethylene feed supply. The controller is set on "air to close." The magnitude of the control signal depends on the magnitude of the transmitter signal, but has a different value which is controlled by a set point knob in the controller. The set point is chosen at some value above the normal reactor operating pressure. It may be near some limit above which reactor malfunction such as formation of insolubles may occur, i.e., 40.8 psig.

When the reactor pressure, is below the set point (as indicated by the pressure transmitter), controller 40 merely transmits a 3 psig. signal to valve 42, keeping it fully opened to permit the primary ethylene feed valve 43 to control the flow of ethylene to the reactor. When the reactor pressure is at the set point, controller 40 transmits a steady signal (e.g., between 3 and 15 psig.) to valve 42 causing it to throttle. Should the reactor pressure exceed the set point, controller 40 will transmit its maximum signal (e.g., 15 psig.) to valve 42 to close it completely. As valve 42 is throttled and closed, reduced ethylene flow to reactor 10 occurs and tends to lower the pressure therein. When the reactor pressure falls below the set point, valve 42 will be once again open wide allowing full ethylene flow and regulation of the ethylene feed will be returned to the primary control system which operates valve 43.

The pneumatic system may also be set to control in reverse order using an "air to open" valve and with the scale calibration reversed. It is to be understood that pressure signals can be transmitted electronically instead of pneumatically by using a pressure transducer.

The present invention is employed as an intermittent secondary control over a reactor which is continually governed by conventional means and when these conventional means are unable to keep the reactor operating at the scheduled pressure and unable to stop operating conditions from drifting toward an undesired situation, the secondary control intervenes as a safety measure. Furthermore, the present invention can be adapted to act as a part of the primary control means.

What I claim is:

1. In an automatically controlled continuous process for manufacturing copolymers of ethylene and propylene containing from about 20 to about 60 weight percent propylene units and up to 3 weight percent of nonconjugated hydrocarbon diene units in a confined reaction zone at a temperature of about 20° to 50°C in the presence of a vanadium coordination catalyst in a copolymer solvent solution of a saturated linear hydrocarbon containing from five to eight carbon atoms, said process carried out with both gas and liquid phases continuously present in said reaction zone, the manufacturing process being controlled normally by a primary control process arrangement which automatically maintains the manufacturing process conditions within certain predetermined normal operating limits, an improved mode of operation comprising continuously preventing general fouling of the reaction zones by automatically temporarily overriding the primary control process and, relatively more rapidly, compared to the action of the primary control process arrangement, reducing supply of ethylene to the reaction zone in response to detection of a decreasing polymerization rate tending to cause an increase in the formation of ethylene rich polymers which would foul the reaction zone, said improved mode of operation further comprising continuously sensing the gas phase pressure in the zone and in response to an increase therein indicative of a decrease in polymerization rate which would cause general fouling, temporarily reducing supply of ethylene until the polymerization rate returns to nonfouling levels, and then returning automatic control of the ethylene supply to the primary control process arrangement.

* * * * *